C. J. STROSACKER.
PROCESS OF MAKING CARBON TETRACHLORID.
APPLICATION FILED JUNE 20, 1911.
1,121,880.
Patented Dec. 22, 1914.
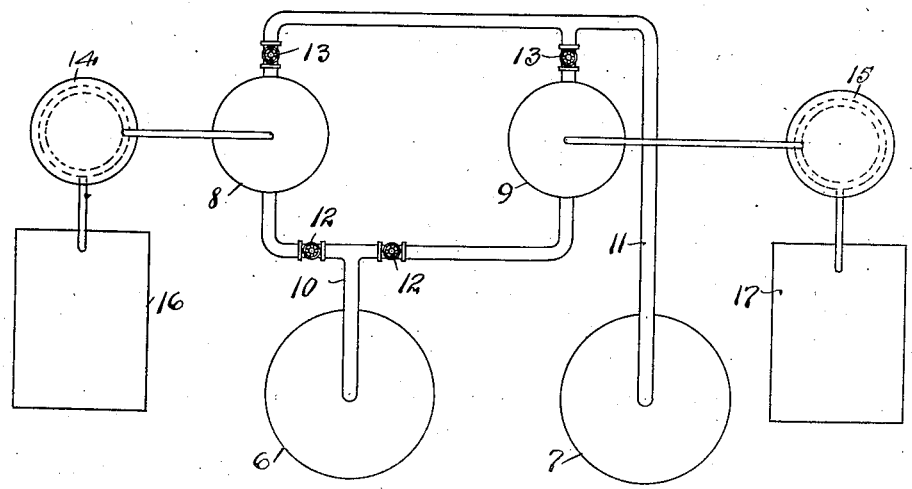
Witnesses.
Oliver M. Kappler.
Jno. F. Oh——
Inventor
Charles J. Strosacker
By J. B. Fay
Attorney

UNITED STATES PATENT OFFICE.

CHARLES J. STROSACKER, OF MIDLAND, MICHIGAN, ASSIGNOR, BY MESNE ASSIGNMENTS, TO THE DOW CHEMICAL COMPANY, OF MIDLAND, MICHIGAN, A CORPORATION OF MICHIGAN.

PROCESS OF MAKING CARBON TETRACHLORID.

1,121,880.

Specification of Letters Patent. Patented Dec. 22, 1914.

Application filed June 20, 1911. Serial No. 634,209.

*To all whom it may concern:*

Be it known that I, CHARLES J. STROSACKER, a citizen of the United States, and a resident of Midland, county of Midland, and State of Michigan, have invented a new and useful Improvement in Processes of Making Carbon Tetrachlorid, of which the following is a specification, the principle of the invention being herein explained and the best mode in which I have contemplated applying that principle, so as to distinguish it from other inventions.

The present method of manfacturing carbon tetrachlorid may be regarded as an improvement in one of the steps in a process of making chloroform set forth in U. S. Patent No. 753,325 to Albert W. Smith, dated March 1, 1904. This step, which may be itself regarded as a process of manufacture, irrespective of whether it be associated with other steps in such patented process or not, involves the conversion of sulfur chlorid to carbon tetrachlorid by mixing carbon disulfid therewith in a suitable retort, and in proper proportions. Either sulfur monochlorid or dichlorid may be used, but the latter is preferred, a suitable catalytic agent being employed in addition to the other ingredients named. The foregoing mixture is then boiled with a fractioner until the reaction ceases. For the present purpose this reaction may be regarded as correctly represented by the following equations:

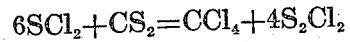
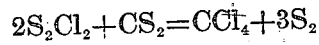

$$6SCl_2 + CS_2 = CCl_4 + 4S_2Cl_2$$
$$2S_2Cl_2 + CS_2 = CCl_4 + 3S_2$$

These reactions, it will be understood, are given merely as representing the net results observed, namely that carbon tetrachlorid is produced by the reaction between carbon disulfid and sulfur monochlorid as well as by that between such disulfid and sulfur dichlorid, and that the residual products remaining in the still after the reaction are mainly sulfur and monochlorid.

In order to obtain a distillate low in carbon disulfid, it is necessary to work with the sulfur chlorid very high in dichlorid, because the reaction between the monochlorid and the disulfid is far less complete than that between the dichlorid and such disulfid. For the production of a sulfur chlorid high in dichlorid, it is necessary to use strong chlorin gas and also to maintain the absorption continually at a comparatively low temperature. Furthermore, it will be readily understood that the higher the sulfur chlorid runs in chlorin, that is in dichlorid, the smaller the quantity that will be necessary to produce a given amount of carbon tetrachlorid so that for this reason, also, it is very desirable to use a sulfur chlorid as strong as it is practical to make, so as to reduce the quantity which has to be handled over and over in the apparatus circuit which includes the chlorinating towers and the reaction still, as well as a crystallizing tank wherein the byproduct sulfur is separated out. It is also evident that it is desirable to have the still residue as high in sulfur as practicable, in order to increase the capacity of the crystallizing step of the process in eliminating this sulfur. With a view to obtaining the foregoing and other desirable results, the present improved process consists of the steps hereinafter described and particularly pointed out in the claims.

The annexed drawing and the following description set forth in detail one approved method of carrying out the invention, such disclosed mode, however, constituting but one of the various ways in which the principle of the invention may be used.

In said annexed drawing:—the single figure there appearing represents a diagrammatic plan view of an apparatus suitable for carrying out the present improved process.

In carrying out the prevailing, or Smith process, as it may be termed, the still is first charged with a measured quantity of sulfur dichlorid, and then a measured quantity of carbon disulfid is gradually run into this charge. At the same time the mixture is stirred in any suitable way and the heat of the reaction is absorbed by means of cooling coils, as need not be more specifically explained. Some distillation may take place during the charging operation, but the principal distillation is done after the disulfid has been completely added, when a heating fluid is admitted to the coils, instead of the previous cooling fluid, so as to heat the charge now consisting of a mixture of carbon tetrachlorid, carbon disulfid and sulfur mono-chlorid, with sulfur in solution. As a result of such heat, the lighter products, namely the tetrachlorid and disulfid pass over through the fractioning column as distillate into the condenser and thence into the storage tank. There finally remains in the still, a quantity of sulfur chlorid containing sulfur in solution. More carbon disulfid is then added to the remaining charge, a second reaction secured, and a second distillation effected, with the result that more carbon tetrachlorid and carbon disulfid distillate is obtained, while the still residue is left richer in dissolved sulfur. The latter, for present purposes, may be regarded as a byproduct and is eliminated by being crystallized out in any suitable fashion.

In the apparatus illustrated in the figure of the drawing carrying out the improved process of manufacture, two stills 6 and 7 and two fractionating columns 8 and 9 are employed, each of such stills being connected with both columns by means of branched vapor pipes 10 and 11. Two valves 12, 12 and 13, 13, respectively are furthermore provided in each such pipe, so that the vapor from either still can be passed into either column, as desired. In connection with the columns there are further provided separate condensers 14 and 15 and storage tanks 16 and 17.

The two stills 6 and 7 are designed to be operated simultaneously, the valves 12 and 13 being so set that when the still 6 is discharging into column 8, the other still 7 is discharging into the other column 9, and vice versa. The cycle of operations then is as follows:—Into one of said stills, as 6, is charged sulfur chlorid containing sulfur dichlorid. A mixture of carbon tetrachlorid, sulfur monochlorid and carbon disulfid, which for the purpose of this description will be called "poor distillate," obtained from the previous operation of one of the stills, is then added to such charge. This poor distillate is so styled because it is relatively low in carbon tetrachlorid; as also because of the relatively high amount of carbon sulfid which it carries. Under certain practical conditions of operation and proportions of apparatus, such poor distillate may average about 75% of carbon tetrachlorid and 15% carbon disulfid. The chlorid in the still reacts with the disulfid and the mixture is distilled through the fractionating column 8, which column is always used for the distillation of the product resulting from the reaction between sulfur chlorid and poor distillate. The product obtained is much higher in carbon tetrachlorid and much lower in carbon disulfid than that before, averaging about 90% of the former and less than 1% of the latter under the same conditions as those involved in describing the poor distillate above. This latter distillate may accordingly for the purpose of distinction from the poor distillate be termed "good distillate." In giving the foregoing average contents of the tetrachlorid and carbon disulfid in "poor" and "good" distillates, respectively, an allowance must of course be made for the sulfur chlorid content, this being here figured at about 10% in the case of each distillate. To the residue remaining in the still, consisting chiefly of sulfur chlorid with a small percentage of carbon tetrachlorid, is added some strong sulfur chlorid and carbon disulfid, and the mixture obtained by the reaction between these ingredients is then distilled through the column 9, the valves in the meantime being reset so that now still 7, which was previously connected with said column 9, is connected with column 8. The distillate from this reaction is caught in the corresponding storage tank and constitutes the "poor distillate" previously referred to. The temperature of the still is carried to such a point at the finish that the carbon tetrachlorid is nearly all removed from the residue, which is sulfur chlorid containing sulfur in solution. This sulfur chlorid residue is very rich in dissolved sulfur and is suited to economical elimination of this sulfur by cooling in a suitable crystallizer or other apparatus appropriate to the purpose. In other words, while still 6 is being operated in connection with column 8 for the production of good distillate, still 7 is being operated in connection with column 9 for the production of poor distillate and, later in the cycle, still 6 is being operated in connection with column 9 for the production of poor distillate while still 7 is being operated in connection with column 8 for the production of good distillate, the cycles of operations being the same in the two stills but one being advanced before the other one-half cycle. In this way the two fractionating columns 8 and 9 are respectively used for the production of only one kind of distillate and after each distillation are left naturally charged with liquor suitable for the continuation of like distillation from the alternate still.

It has been found that with the use of two stills and two columns, operated in the manner described, it is possible to use a sulfur chlorid much poorer in chlorin than is practicable by the method heretofore used and at the same time a final product is obtained containing far less carbon disulfid and sulfur chlorid than heretofore; further the step in the general process involving the manufacture of sulfur chlorid is greatly facilitated because a weaker sulfur chlorid can be used, permitting the use of a commercial chlorin gas much lower in chlorin and requiring but a fraction of the attention and testing by the attendant which is otherwise necessary to obtain both a high strength chlorin gas and a high strength sulfur chlorid. Further advantages realized are the increase of the yield in the following steps of purification, because of the smaller amount of carbon disulfid to be eliminated, requiring less of the strong sulfur chlorid to be added in the purification step, in which the good distillate is treated, and in a later step requiring less lime and involving a far less loss of chlorin in the sulfur chlorid there eliminated. A still further advantage is that the still residues being very rich in dissolved sulfur, it becomes possible to eliminate enough sulfur by treating only a relatively small portion of this still residue in the crystallizer and allowing the larger portion of such residue to go back directly to the chlorination step in the sulfur chlorid reaction towers. This permits the use of smaller apparatus, or of getting larger capacity out of the apparatus heretofore used for the elimination of sulfur.

Although the use of two separate and distinct fractionating columns as described, is preferred, each being used for the production of only one of the distillates, yet with certain types of fractionating columns, which are self-draining, it is permissible to use two such separate columns connected only to their corresponding stills and to use each for the successive distillations in the still for the production of both distillates in the same column and connected condenser, by-pass connections being provided between the condensers and the storage tanks, so that the different distillates may be run to their corresponding tanks.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The process of making carbon tetrachlorid, which consists in mixing sulfur chlorid with carbon tetrachlorid distillate high in carbon disulfid and distilling, whereby a second distillate relatively low in carbon disulfid is obtained; adding to the still residue sulfur chlorid and carbon disulfid and redistilling, whereby a distillate relatively high in carbon disulfid is obtained; then repeating such cycle of steps with this last distillate and the products thereof, the first and second distillations of each cycle being alternately conducted in each of two stills.

2. The process of making carbon tetrachlorid, which consists in mixing sulfur chlorid with carbon tetrachlorid distillate high in carbon disulfid and distilling, whereby a second distillate relatively low in carbon disulfid is obtained; adding to the still residue sulfur chlorid and carbon disulfid and redistilling, whereby a distillate relatively high in carbon disulfid is obtained; then repeating such cycle of steps with this last distillate and the products thereof, the distillate high in carbon disulfid and the distillate low in carbon disulfid being condensed in the same two condensers, respectively, in each cycle.

3. The process of making carbon tetrachlorid, which consists in mixing sulfur chlorid with carbon tetrachlorid distillate high in carbon disulfid and distilling, whereby a second distillate relatively low in carbon disulfid is obtained; adding to the still residue sulfur chlorid and carbon disulfid and redistilling, whereby a distillate relatively high in carbon disulfid is obtained; then repeating such cycle of steps with this last distillate and the products thereof, the first and second distillations of each cycle being alternately conducted in each of two stills, but the distillate high in carbon disulfid and the distillate low in carbon disulfid being condensed in the same two condensers, respectively, in each such cycle.

4. The process of making carbon tetrachlorid, which consists in mixing sulfur chlorid with carbon tetrachlorid distillate high in carbon disulfid and distilling, whereby a second distillate relatively low in carbon disulfid is obtained; adding to the still residue sulfur chlorid and carbon disulfid and redistilling, whereby a distillate relatively high in carbon disulfid is obtained; then repeating such cycle of steps with this last distillate and the products thereof, the distillate high in carbon disulfid and the distillate low in carbon disulfid being passed through the same two fractionating columns, respectively, in each cycle.

5. The process of making carbon tetrachlorid, which consists in mixing sulfur chlorid with carbon tetrachlorid distillate high in carbon disulfid and distilling, whereby a second distillate relatively low in carbon disulfid is obtained; adding to the still residue sulfur chlorid and carbon disulfid and redistilling, whereby a distillate relatively high in carbon disulfid is obtained; then repeating such cycle of steps with this last distillate and the products thereof, the distillate high in carbon disulfid and the distillate low in carbon disulfid being passed through the same two fractionating columns, respectively, in each cycle and being condensed in the same two condensers, respectively, in each such cycle.

6. The process of making carbon tetrachlorid, which consists in mixing sulfur chlorid with carbon tetrachlorid distillate high in carbon disulfid and distilling, whereby a second distillate relatively low in carbon disulfid is obtained; adding to the still residue sulfur chlorid and carbon disulfid and redistilling, whereby a distillate relatively high in carbon disulfid is obtained; then repeating such cycle of steps with this last distillate and the products thereof, the first and second distillations of each cycle being alternately conducted in each of two stills, but the distillate high in carbon disulfid and the distillate low in carbon disulfid being fractionated through the same fractionating columns, respectively, and being condensed in the same two condensers, respectively, in each such cycle.

Signed by me this 16 day of June, 1911.

CHARLES J. STROSACKER.

Attested by—
Thos. Griswold, Jr.,
E. O. Barstow.